Figure 1:
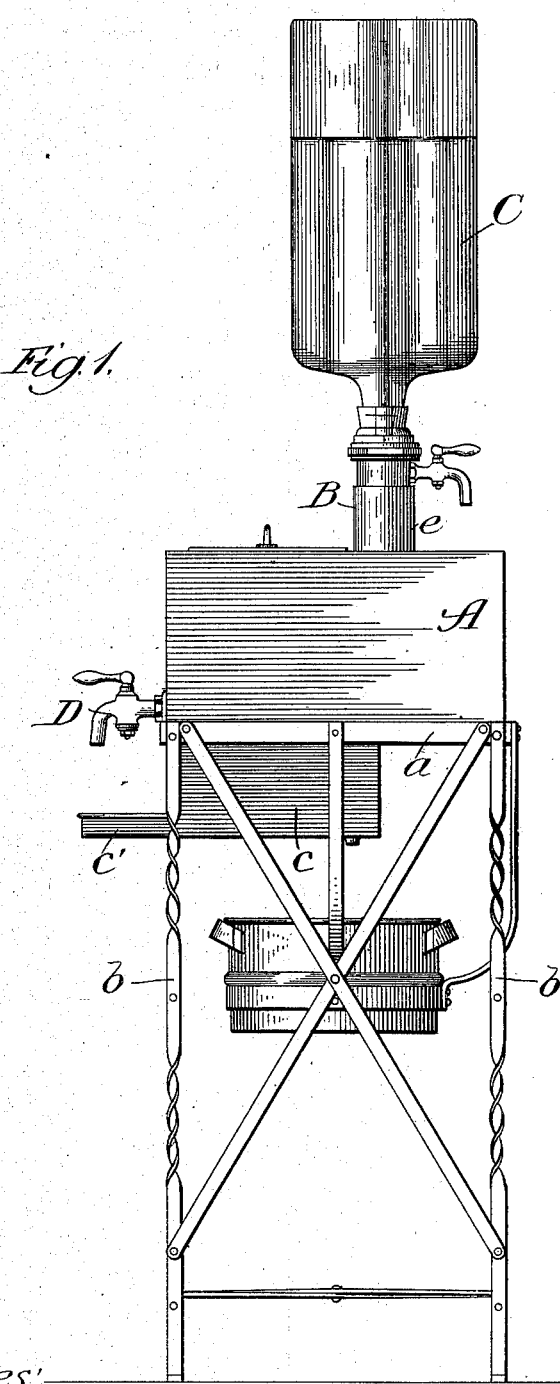

No. 738,712. PATENTED SEPT. 8, 1903.
J. T. COLE.
WATER COOLER EQUIPMENT.
APPLICATION FILED FEB. 11, 1903.
NO MODEL. 3 SHEETS—SHEET 1.

Witnesses:
Inventor:
James T. Cole,
By Dyrenforth, Dyrenforth & Lee,
Attys.

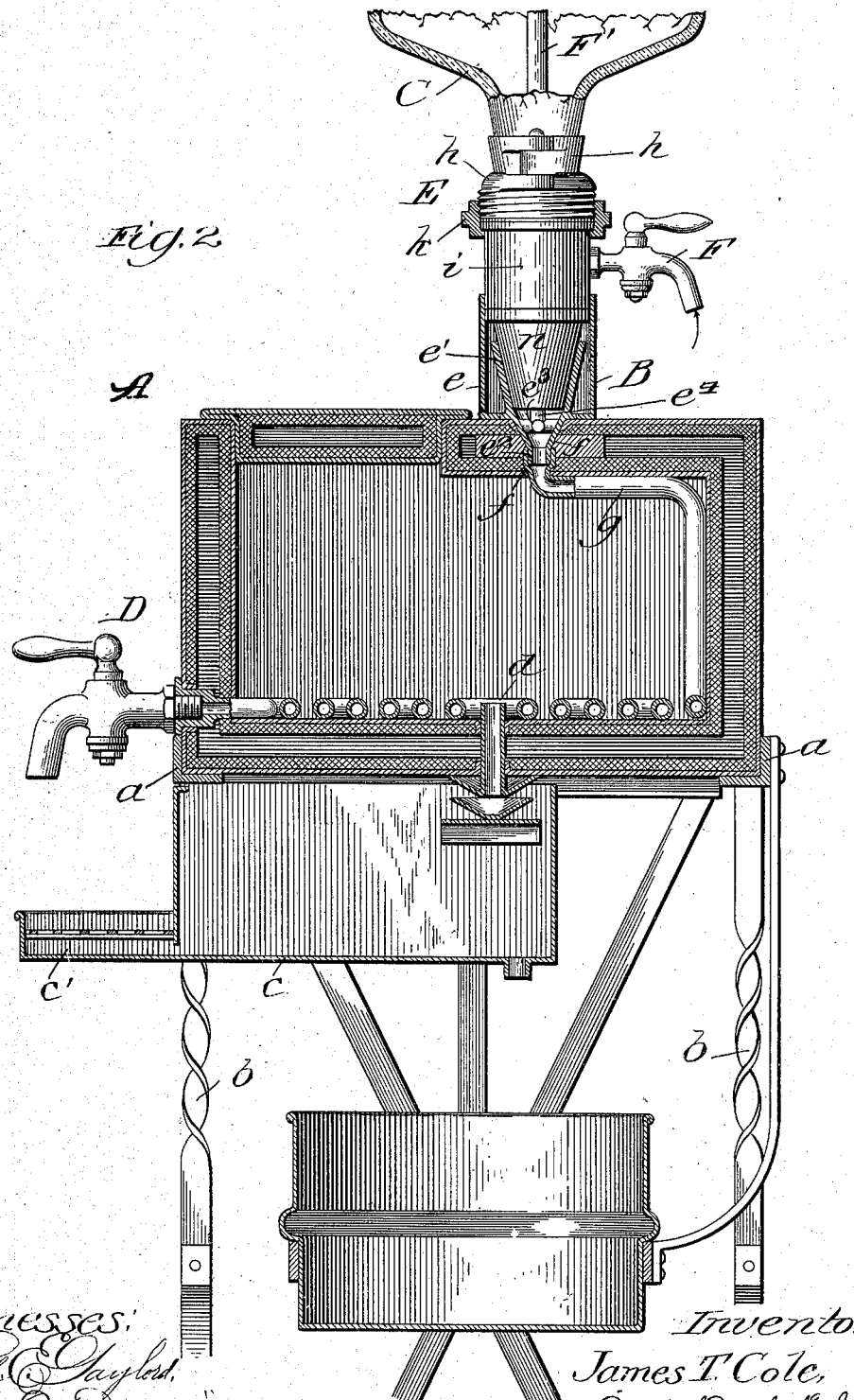

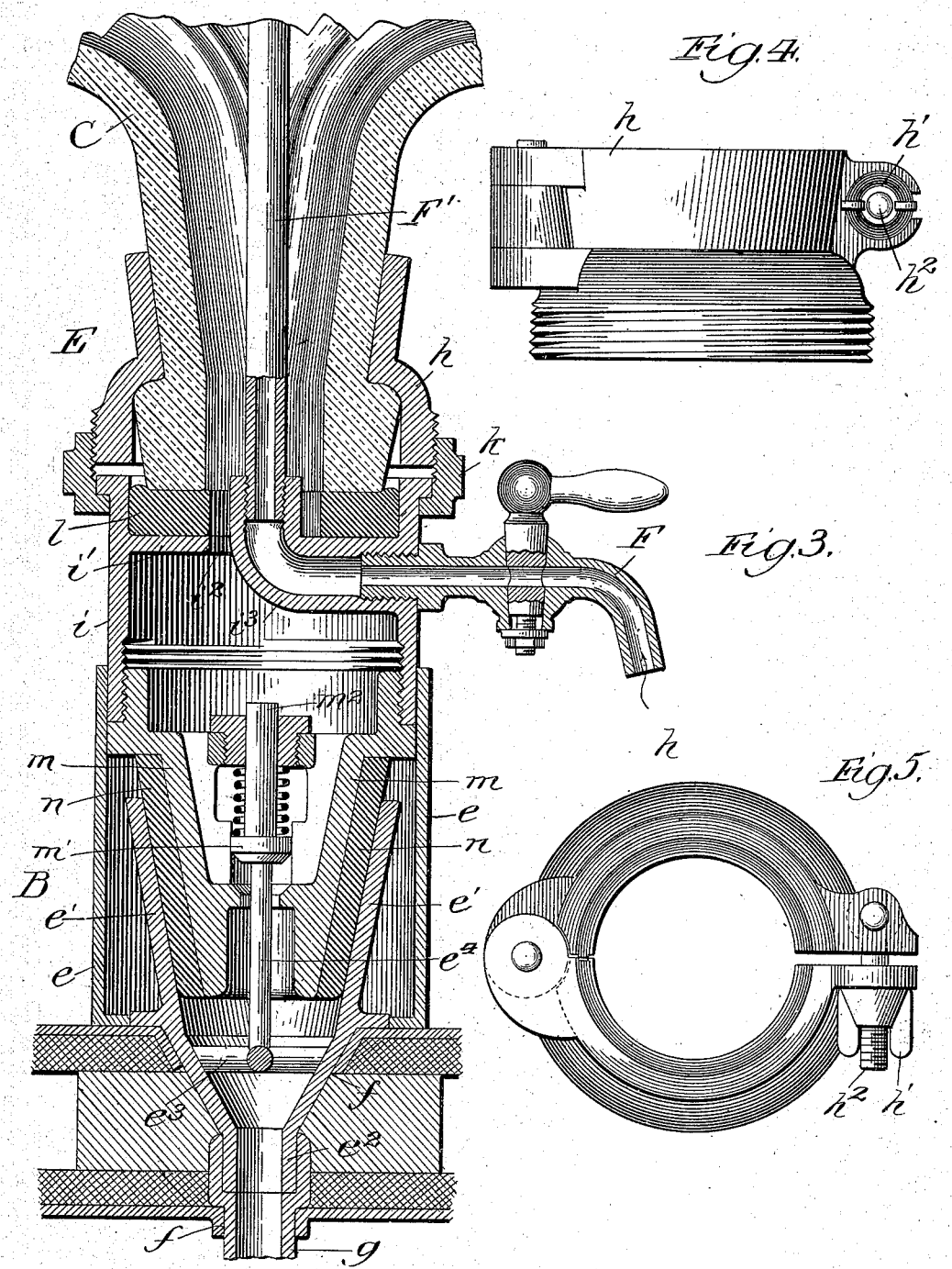

No. 738,712. Patented September 8, 1903.

UNITED STATES PATENT OFFICE.

JAMES T. COLE, OF CHICAGO, ILLINOIS, ASSIGNOR TO THE CONSUMERS COMPANY, A CORPORATION OF ILLINOIS.

WATER-COOLER EQUIPMENT.

SPECIFICATION forming part of Letters Patent No. 738,712, dated September 8, 1903.

Application filed February 11, 1903. Serial No. 142,822. (No model.)

*To all whom it may concern:*

Be it known that I, JAMES T. COLE, a citizen of the United States, residing at Chicago, in the county of Cook and State of Illinois, have invented a new and useful Improvement in Water-Cooler Equipments, of which the following is a specification.

My invention relates to an improvement in the class of appurtenances commonly known as "water-coolers," which are provided as their more ordinary use in offices and households for supplying to the inmates drinking-water furnished from time to time as the supply requires replenishment by dealers in such water.

It is a common practice of such dealers to distribute the drinking-water to their customers in portable holders, such as sheet-metal cans and glass bottles, each containing a predetermined quantity, (usually a number of gallons,) and from a holder thus delivered the contents are usually poured or a portion thereof from time to time into the tank of the cooler, wherein the water is subjected to the cooling influence of ice provided in the cooler and whence the water is drawn off for drinking through a faucet. The common practice thus stated is objectionable, because the water so supplied, which is delivered in a pure condition by the dealer, is subjected to contamination from the air to which it is exposed in the cooler-tank and while being poured therein, as also from impurities in the tank itself. Moreover, when the tank is caused to hold a supply of drinking-water the entire quantity thereof in the tank is subjected to the cooling effect of the ice-supply, whereby the latter is extravagantly consumed.

The primary object of my invention is to overcome the first named of the objections referred to. This I accomplish by adapting the portable holder in which the water-supply is delivered to the consumer to be seated at its neck in an inverted position on or in the cooler-tank in valve-controlled communication with the draw-off faucet, whereby the draft-supply may be taken from time to time directly from the original holder. This construction thus generally outlined also permits the water from the inverted holder to be passed to the faucet through a pipe-coil packed with or supporting a supply of ice, whereby only the contents of the coil are subjected to the refrigerating influence and whereby, therefore, the second named of my aforesaid objects is accomplished.

Referring to the accompanying drawings, Figure 1 shows a water-cooler with my improved equipment in its preferred form in side elevation. Fig. 2 is an enlarged longitudinal vertical section of the same with the lower portion of the stand and the upper portion of the water-holder broken away; Fig. 3, an enlarged view in vertical sectional elevation, showing the neck of the portable water-holder provided with its seating attachment and the seat therefor on the cooler-tank; Fig. 4, a view in side elevation of a clamping-collar detail through the medium of which the seating attachment for the water-holder neck may be separably fastened thereto, and Fig. 5 a plan view of the clamping-collar.

A denotes the cooler-tank, which may be formed in any desired shape of sheet metal or other suitable material. It is represented as resting on a bed $a$, supported on braced legs $b$, and as carrying on its base a withdrawable and replaceable waste-water receptacle $c$, having a drinking-glass support $c'$ extending from it. In Fig. 2 a sealed drip-pipe $d$ is shown leading from the base of the tank A into the receptacle $c$. The parts thus described need involve no feature of novelty.

B is a seat for supporting at its neck in the manner hereinafter described a portable holder C, containing the supply of drinking-water. The seat B, as shown, is formed of an upright sleeve $e$, secured at its flanged base to the top of the cooler-tank about an opening $f$ through it, connected by a pipe $g$ with a draw-off faucet D, projecting from the tank. The pipe $g$ is represented in Fig. 2 in its preferred form as including a coil on the bottom of the tank, so that when ice is contained in the tank it will exert its cooling effect through the coil upon the contents thereof. Within the sleeve $e$ is seated and fastened a cup $e'$ of tapering shape, which is best formed as a flanged metal casting with a nipple $e^2$ at its lower end at which to attach the pipe $g$, and from a spider $e^3$ in the bottom of the cup over the opening $f$ there extends upward a rigid stop $e^4$, shown as a vertical rod.

For the general purposes of my improvement the portable holder C may be of any suitable variety, provided its discharge-outlet is in the form of a nozzle or neck. On the neck of the holder C is provided a valved seating attachment E. As shown, the valved seating attachment involves the following construction: A clamping-collar $h$ surrounds the neck of the holder and is preferably formed of the two hinged sections illustrated, separably fastened at one end by a wing-nut $h'$, engaging with a bolt $h^2$ to adapt the collar to be removably attached to the neck. A sleeve $i$, flanged at one end and internally threaded toward its opposite end, is connected with the threaded end of the collar $h$ by a flanged coupling-ring $k$, engaging the sleeve at its flange. This sleeve $i$ is cast with an internal ring $i'$, forming the passage $i^2$, and with a tubular neck $i^3$, into the upturned end of which is screwed a vent-tube $F'$, the opposite end of the neck having screwed into it a vent-cock F. Between the holder-neck and the ring $i'$ is interposed a rubber gasket $l$. A valve-seat $m$, cast in the tapering form illustrated, is screwed into the sleeve $i$ and carries a spring-pressed check-valve $m'$ on a stem $m^2$, the valve and stem being provided with suitable guides, and a rubber gasket $n$ surrounds the valve-seat and is provided in a shape to conform to the external surface of the valve-seat and to the internal surface of the seating-cup $e'$.

To apply my invention practically, a holder C, containing the supply of drinking-water, which is delivered to the consumer in sealed condition, as by a cork in the neck, is opened at the place of use of the water, and the seating attachment E is adjusted on the neck, as illustrated in Fig. 3. In the adjustment of the seating attachment the vent-tube $F'$ enters the holder. With the attachment in place the gasket $l$ and valve $m'$ effectually seal the holder, which is thereupon inverted and introduced at the gasket-covered valve-seat $m$ into the seating-cup $e'$ on the tank A, in which inverted position it is thus sustained with adequate firmness. In adjusting the holder, as described, the stop-rod $e^4$ abuts against the valve $m'$, raising it from its seat and permitting water from the holder under the action of the vent on opening the cock F to flow into and fill the coil $g$, whence it may be withdrawn as desired through the faucet D.

If the portable holder C is seated at its neck in an exposed condition, as shown, instead of being inclosed in a tank, as it may be without departure from my invention, I prefer to provide the holder of transparent glass, since thereby the clear condition of the water is always in view, with the advantage of displaying it for the benefit of the consumer and that of the dealer, to whom the exposure serves as a means of advertisement.

While the particular construction shown and described of means for seating the portable holder in inverted position at its neck for accomplishing my purpose is the best now known to me, it may be variously modified without departure from my invention. Hence I do not limit my invention to that construction. Moreover, although I have referred herein only to drinking-water as forming the contents of the portable holder my invention is obviously equally useful in connection with any liquid beverage forming such contents.

It will be understood from the description that it is my intention, because preferable, though not essential, that the seating attachment for the bottle or holder shall remain where the cooler is located, where it is conveniently accessible for adjustment on a fresh holder after being detached from one that has been emptied.

What I claim as new, and desire to secure by Letters Patent, is—

1. In combination, a cooler-tank provided with a draw-off faucet and containing a pipe-coil leading to said faucet, a seat on said tank comprising a downwardly-tapering cup opening into the inlet end of said coil and containing a stop, a portable liquid-holder having a neck, a gasket-covered valve-seat secured to said neck to enter and fit in said cup to seat therein said holder at its neck, and an inwardly-opening check-valve in said seat in position to be engaged by said stop.

2. In combination, a cooler-tank provided with a draw-off faucet and containing a pipe-coil leading to said faucet, a seat on said tank comprising an upright sleeve, a cup therein opening into the inlet end of said coil and containing a stop, a portable liquid-holder having a neck, and a gasket-covered valve-seat secured to said neck to enter said cup and seat therein said holder at its neck, and an inwardly-opening check-valve in said seat in position to be engaged by said stop.

3. In combination, a cooler-tank provided with a draw-off faucet and containing a pipe-coil leading to said faucet, a seat on said tank comprising an upright sleeve, and a downwardly-tapering cup therein connected at its open base with the inlet end of said coil and containing a stop, a portable liquid-holder having a neck, and a seating attachment for said holder comprising a collar surrounding the holder-neck, a sleeve coupled to said collar and carrying a tubular neck provided at one end with a vent-tube to enter said holder and at its opposite end with a vent-cock, a tapering valve-seat connected with said sleeve and provided with a gasket to enter said cup for seating said holder in inverted position at its neck, and a spring-pressed check-valve confined in said valve-seat in position to be engaged by said stop.

JAMES T. COLE.

In presence of—
L. HEISLAR,
WALTER WINBERG.